(12) United States Patent
Song et al.

(10) Patent No.: US 11,740,324 B2
(45) Date of Patent: Aug. 29, 2023

(54) CHANNEL COMBINING AND TIME-DIVISION PROCESSING CIRCUIT OF DUAL-PLANE PULSE DOPPLER RADAR SEEKER

(71) Applicant: Naval Aeronautical University, People's Liberation Army, Yantai (CN)

(72) Inventors: Weijian Song, Yantai (CN); Longjun Zhai, Yantai (CN); Shan Gao, Yantai (CN); Bo Dan, Yantai (CN); Jianhu Liang, Yantai (CN); Jianli Han, Yantai (CN)

(73) Assignee: Naval Aeronautical University, People's Liberation Army, Yantai (CN)

( * ) Notice: Subject to any disclaimer, the term of this patent is extended or adjusted under 35 U.S.C. 154(b) by 230 days.

(21) Appl. No.: 17/343,099

(22) Filed: Jun. 9, 2021

(65) Prior Publication Data

US 2022/0003836 A1 Jan. 6, 2022

(30) Foreign Application Priority Data

Jul. 2, 2020 (CN) .......................... 202010625417.2

(51) Int. Cl.
*G01S 7/292* (2006.01)
*G01S 13/42* (2006.01)
*G01S 13/53* (2006.01)

(52) U.S. Cl.
CPC .......... *G01S 7/2926* (2013.01); *G01S 13/428* (2013.01); *G01S 13/53* (2013.01)

(58) Field of Classification Search
CPC ...... G01S 13/428; G01S 13/44; G01S 13/524; G01S 13/53; G01S 13/883; G01S 7/2926
See application file for complete search history.

(56) References Cited

U.S. PATENT DOCUMENTS

| | | | |
|---|---|---|---|
| 9,746,545 B1* | 8/2017 | Prestwich | G01S 7/285 |
| 2018/0074183 A1* | 3/2018 | Sheret | G01S 7/285 |
| 2018/0120427 A1* | 5/2018 | Cornic | G01S 13/343 |
| 2018/0192298 A1* | 7/2018 | Noerpel | H01Q 21/22 |

* cited by examiner

*Primary Examiner* — Timothy X Pham
(74) *Attorney, Agent, or Firm* — Fox Rothschild LLP

(57) ABSTRACT

The disclosure discloses a channel combining and time-division processing circuit of a dual-plane pulse Doppler radar seeker. The circuit includes a time-division control circuit configured to receive a time-division control signal, control input of an elevation difference channel signal and an azimuth difference channel signal, combine the elevation difference channel signal and the azimuth difference channel signal and output a combined difference channel signal, and a hybrid bridge circuit configured to receive a sum channel signal, combine channels for the sum channel signal and the combined difference channel signal and output signals on a combined channel. With the circuit of the disclosure, signals received from a sum channel, an azimuth difference channel and an elevation difference channel can be combined into received signals from two channels for processing with one received signal processing channel hardware omitted.

7 Claims, 6 Drawing Sheets

(a)

(b)

(c)

CHANNEL COMBINING AND TIME-DIVISION PROCESSING CIRCUIT OF DUAL-PLANE PULSE DOPPLER RADAR SEEKER

TECHNICAL FIELD

The disclosure relates to the technical field of pulse Doppler radar seekers, and in particular, to a channel combining and time-division processing circuit of a dual-plane pulse Doppler radar seeker.

BACKGROUND

Pulse Doppler radar seekers have been widely used now. Dual-plane pulse Doppler radar seekers can perform angular measurement on a target and target tracking in planes of azimuth and elevation. Therefore, a dual-plane pulse Doppler radar seeker may generally have three receiving channels, namely a sum channel, an azimuth difference channel and an elevation difference channel. In addition, to reduce error in angular measurement, the three receiving channels are required to maintain good consistency in amplitude and phase.

With channel combining and time-division processing of the azimuth difference channel and the elevation channel of a dual-plane non-coherent monopulse Doppler radar seeker, three channels of a receiver of the dual-plane pulse Doppler radar seeker can be combined into two channels. Thus, the cost of system hardware may be reduced on the one hand, and on the other hand, the consistency between the receiving channels in amplitude and phase may be guaranteed with reduced difficulty in regulation thereof.

However, due to pulse integration and Doppler information processing required on sum and difference channel signals over a pulse integration time interval, the channel combining and time-division processing of difference channel signals would be difficult to realize with regard to such a dual-plane pulse Doppler radar seeker.

SUMMARY

An objective of the disclosure is to provide a channel combining and time-division processing circuit of a dual-plane pulse Doppler radar seeker that can combine signals received from a sum channel, an azimuth difference channel and an elevation difference channel into received signals from two channels for processing with one received signal processing channel hardware omitted. As a result, the equipment cost can be reduced, and good phase consistency of the receiving channels can be ensured, allowing for reduction of error in angular measurement.

To achieve the above purpose, the disclosure provides the following technical solutions.

A channel combining and time-division processing circuit of a dual-plane pulse Doppler radar seeker includes:

a time-division control circuit and a hybrid bridge circuit, the two of which are connected;

where the time-division control circuit is configured to receive a time-division control signal, control input of an elevation difference channel signal and an azimuth difference channel signal according to the time-division control signal, combine the input elevation difference channel signal and azimuth difference channel signal and output a combined difference channel signal; and the hybrid bridge circuit is configured to receive a sum channel signal, combine channels for the sum channel signal and the combined difference channel signal and output signals on a combined channel.

Optionally, the time-division control circuit specifically includes:

a first time-division switch, a second time-division switch and a signal combining module;

where the first time-division switch is connected to a first branch arm of the signal combining module and configured to receive a first time-division control signal and the elevation difference channel signal and control the input of the elevation difference channel signal to the signal combining module according to the first time-division control signal;

the second time-division switch is connected to a second branch arm of the signal combining module and configured to receive a second time-division control signal and the azimuth difference channel signal and control the input of the azimuth difference channel signal to the signal combining module according to the second time-division control signal; and the signal combining module is connected to the hybrid bridge circuit by means of a third branch arm and configured to combine the elevation difference channel signal and the azimuth difference channel signal and input the combined difference channel signal to the hybrid bridge circuit.

Optionally, the signal combining module is an H-plane waveguide T-junction.

Optionally, the hybrid bridge circuit specifically includes:

a first bridge, a second bridge, a third bridge and a phase modulation switch;

where an input port of the first bridge is connected to the third branch arm of the signal combining module; a coupled port and a straight-through port of the first bridge are both connected to the phase modulation switch that is configured to receive a phase modulation control signal and perform phase modulation according to the phase modulation control signal; an isolated port of the first bridge is connected to an input port of the second bridge and configured to input a phase modulated signal to the second bridge;

an input port of the third bridge is configured to receive the sum channel signal; a straight-through port of the third bridge is connected to an isolated port of the second bridge; and a coupled port and a straight-through port of the second bridge are both configured to output the signals on the combined channel.

Optionally, an isolated port of the third bridge is configured to receive the input of a self-test signal which is used to stimulate an input sum channel signal in a self-test condition of the radar seeker.

Optionally, the hybrid bridge circuit further includes:

a matched load;

where the matched load is connected to a coupled port of the third bridge and configured to suppress echo from the coupled port of the third bridge.

Optionally, the first bridge and the second bridge are rectangular waveguide broad-wall coupled 3 dB bridges, and the third bridge is a 13 dB bridge.

Optionally, the first time-division switch and the second time-division switch are PIN waveguide switches.

Compared with the prior art, the disclosure achieves the following beneficial effects:

The disclosure provides a channel combining and time-division processing circuit of a dual-plane pulse Doppler radar seeker, including a time-division control circuit configured to receive a time-division control signal, control input of an elevation difference channel signal and an azimuth difference channel signal, combine the elevation difference channel signal and the azimuth difference channel signal and output a combined difference channel signal, and a hybrid bridge circuit configured to receive a sum channel signal, combine channels for the sum channel signal and the combined difference channel signal and output signals on a combined channel. According to the disclosure, the signals received from the sum, azimuth difference and elevation difference channels can be combined into received signals from two channels for processing with one received signal processing channel hardware omitted. As a result, the equipment cost can be reduced, and good phase consistency of the receiving channels can be guaranteed, allowing for reduction of error in angular measurement.

BRIEF DESCRIPTION OF DRAWINGS

In order to explain the technical solutions in examples of the disclosure or in the prior art more clearly, the accompanying drawings required in the examples will be described below briefly. Apparently, the accompanying drawings in the following description show merely some examples of the disclosure, and a person of ordinary skill in the art may still derive other accompanying drawings from such drawings without creative efforts.

DETAILED DESCRIPTION

The technical solutions in the examples of the disclosure will be described below clearly and completely with reference to the accompanying drawings in the examples of the disclosure. Apparently, the described examples are merely a part rather than all of the examples of the disclosure. All other examples derived from the examples of the disclosure by a person of ordinary skill in the art without creative efforts shall fall within the protection scope of the disclosure.

An objective of the disclosure is to provide a channel combining and time-division processing circuit of a dual-plane pulse Doppler radar seeker that can combine signals received from a sum channel, an azimuth difference channel and an elevation difference channel into received signals from two channels for processing with one received signal processing channel hardware omitted. As a result, the equipment cost can be reduced, and good phase consistency of the receiving channels can be ensured, allowing for reduction of error in angular measurement.

To make the foregoing objective, features, and advantages of the disclosure clearer and more comprehensible, the disclosure will be further described in detail below with reference to the accompanying drawings and specific implementations.

EXAMPLE

Figure 1:
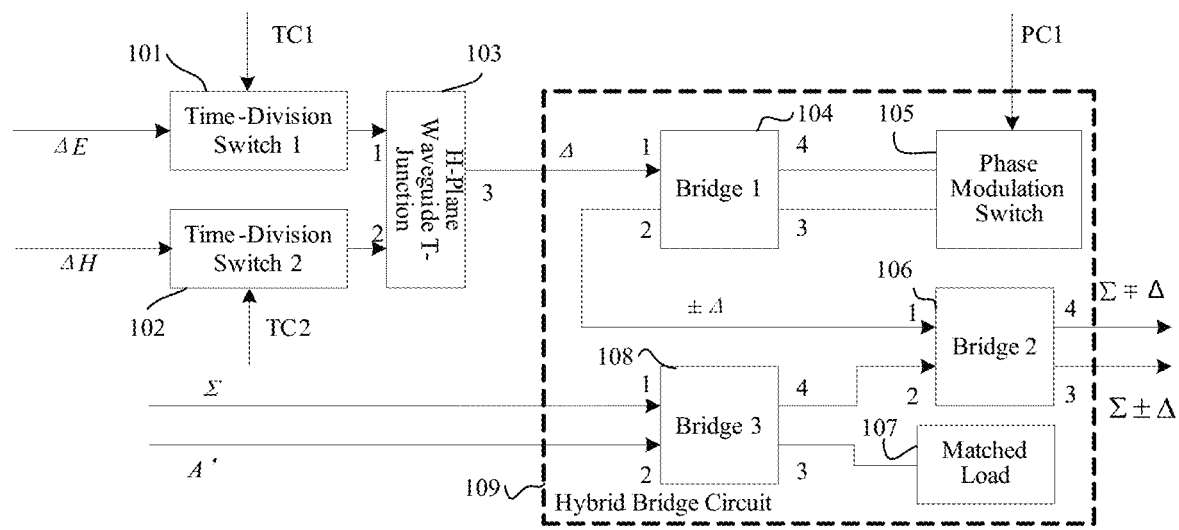
FIG. 1 is a diagram of a channel combining and time-division processing circuit of a dual-plane pulse Doppler radar seeker according to an example of the disclosure.
Figure 2:
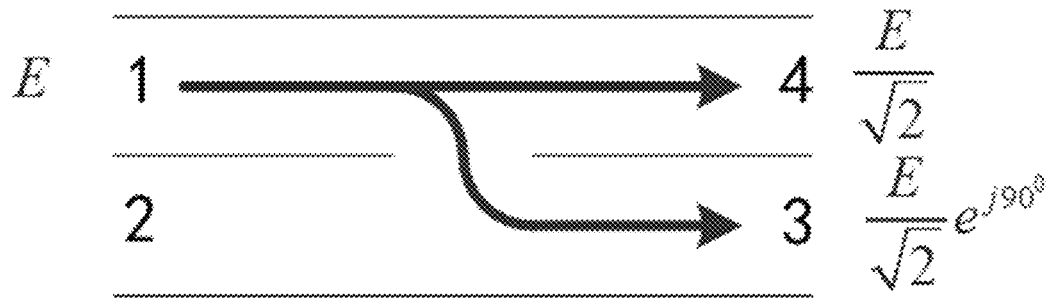
FIG. 2 is a structural schematic diagram of a waveguide broad-wall coupled 3 dB bridge according to an example of the disclosure.

FIG. 1 is a diagram illustrating a channel combining and time-division processing circuit of a dual-plane pulse Doppler radar seeker according to an example of the disclosure. As shown in FIG. 1, the channel combining and time-division processing circuit of a dual-plane pulse Doppler radar seeker includes a time-division control circuit configured to receive a time-division control signal, control input of an elevation difference channel signal $\Delta E$ and an azimuth difference channel signal $\Delta H$ according to the time-division control signal, combine the input elevation difference channel signal and azimuth difference channel signal and output a combined difference channel signal $\Delta$, and a hybrid bridge circuit configured to receive a sum channel signal $\Sigma$, combine channels for the sum channel signal and the combined difference channel signal and output signals $\Sigma \mp \Delta$ and $\Sigma \pm \Delta$ on a combined channel.

The time-division control circuit specifically includes a first time-division switch 101 (time-division switch 1), a second time-division switch 102 (time-division switch 2), and a signal combining module 103. The first time-division switch 101 is connected to a first branch arm of the signal combining module 103 and configured to receive a first time-division control signal (time-division control signal 1 TC1) and the elevation difference channel signal $\Delta E$ and control the input of the elevation difference channel signal to the signal combining module 103 according to the first time-division control signal TC1. The second time-division switch 102 is connected to a second branch arm of the signal combining module 103 and configured to receive a second time-division control signal (time-division control signal 2 TC2) and the azimuth difference channel signal $\Delta H$ and control the input of the azimuth difference channel signal $\Delta H$ to the signal combining module 103 according to the second time-division control signal TC2. The signal combining module 103 is connected to the hybrid bridge circuit by means of a third branch arm and configured to combine the elevation difference channel signal and the azimuth difference channel signal $\Delta H$ and input the combined difference channel signal $\Delta$ to the hybrid bridge circuit 109.

The first time-division switch 101 and the second time-division switch 102 are PIN waveguide switches, and the signal combining module 103 is an H-plane waveguide T-junction. With the structure in such a form, the function of a common time-division switch can be accomplished, and the elevation difference channel signal $\Delta E$ and the azimuth difference channel signal $\Delta H$ can be controlled independently. Taking long-range detection for example, permission may be given only to the passage of the azimuth difference channel signal $\Delta H$ with no need for an elevation difference signal, while in short-range tracking, permission may be given to the passage of the elevation difference channel signal $\Delta E$ and that of the azimuth difference channel signal $\Delta H$ at different time. This renders the use more flexible.

The hybrid bridge circuit 109 specifically includes a first bridge 104 (bridge 1), a second bridge 106 (bridge 2), a third bridge 106 (bridge 3), a phase modulation switch 105, and a matched load 107. An input port of the first bridge 104 is connected to the third branch arm of the signal combining module 103. A coupled port and a straight-through port of the first bridge are both connected to the phase modulation switch 105 that is configured to receive a phase modulation control signal (phase modulation control signal 1 PC1) and perform 0/π phase modulation on the difference channel signal Δ according to the phase modulation control signal PC1. An isolated port of the first bridge 104 is connected to an input port of the second bridge and configured to input a phase modulated signal (±Δ) to the second bridge 106. An input port of the third bridge 108 is configured to receive the sum channel signal Σ, and a straight-through port of the third bridge 108 is connected to an isolated port of the second bridge 106. A coupled port and a straight-through port of the second bridge 106 are both configured to output the signals on the combined channel. An isolated port of the third bridge 108 is configured to receive the input of a self-test signal A' which is used to stimulate an input sum channel signal in self-test condition of the radar seeker. The matched load 107 is connected to a coupled port of the third bridge 108 and configured to suppress echo from the coupled port of the third bridge 108. The first bridge 104 and the second bridge 106 are rectangular waveguide broad-wall coupled 3 dB bridges, and the third bridge 108 is a 13 dB bridge.

According to the disclosure, with the channel combining and time-division control on the sum, azimuth difference and elevation difference receiving channels, the received signals from the three channels can be combined into received signals from two channels for processing with no effect on pulse Doppler integration. Thus, with one received signal processing channel hardware omitted, the equipment cost can be reduced. Each of the combined signals from two channels includes the information of the sum, azimuth difference and elevation difference channels, thereby allowing the sum, azimuth difference and elevation difference signals to maintain good consistency in amplitude and phase.

Figure 3:
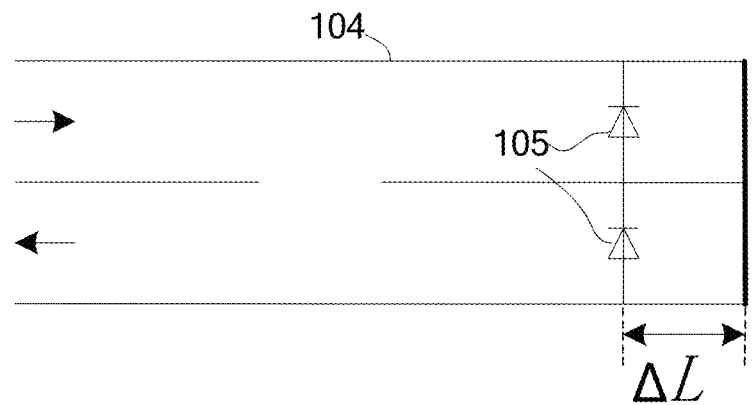
FIG. 3 is a schematic diagram of $0/\pi$ modulation by a hybrid bridge circuit according to an example of the disclosure.
Figure 3:
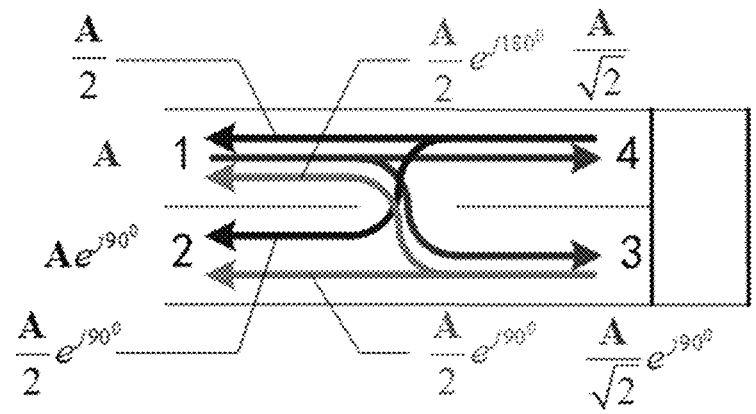
Figure 3:
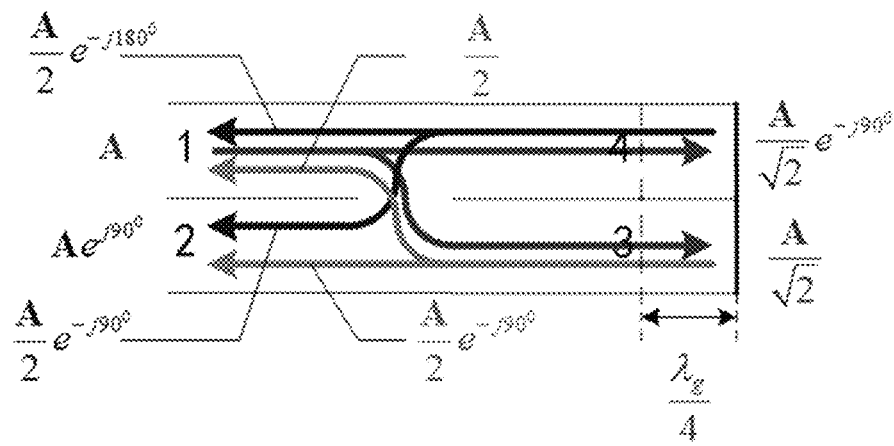
Figure 4:
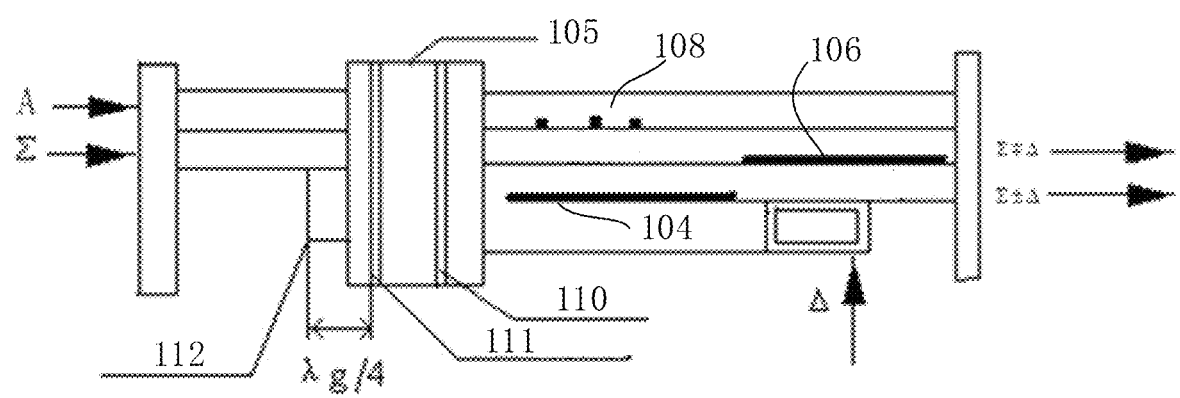
FIG. 4 is a schematic diagram of a hybrid bridge circuit according to an example of the disclosure.
Figure 5:
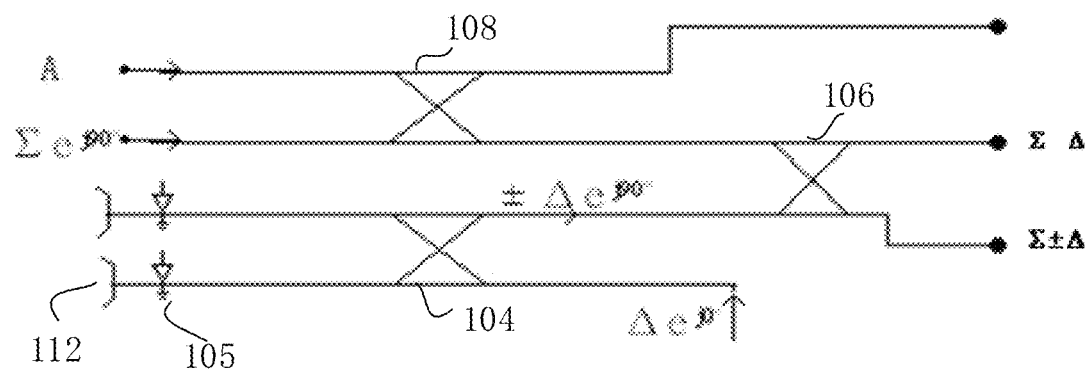
FIG. 5 is a diagram illustrating the principle of the hybrid bridge circuit according to the example of the disclosure.
Figure 6:
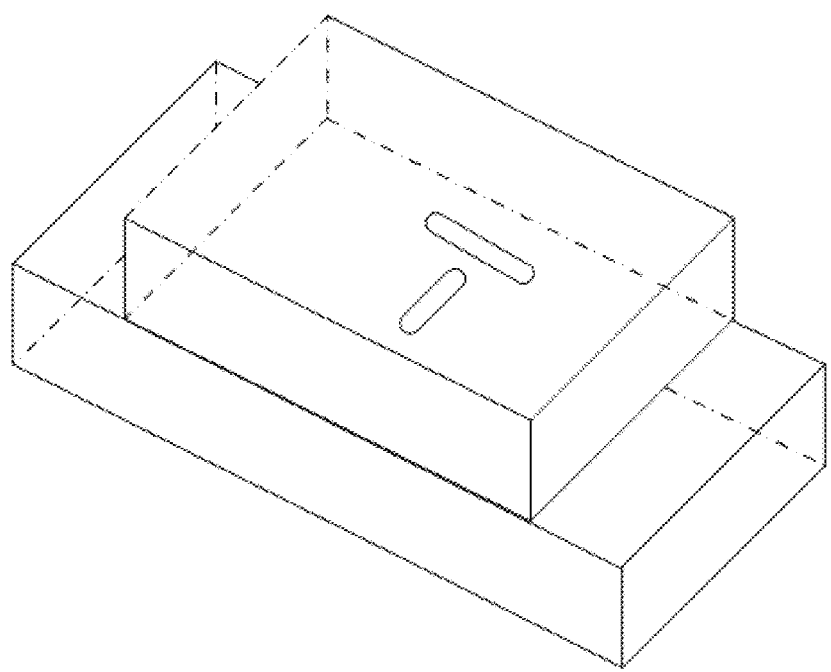
FIG. 6 is a schematic diagram of a Riblet T-shaped slot coupler according to an example of the disclosure.

FIG. 3(a) illustrates the structure of a 0/π modulator. FIG. 3(b) illustrates a short circuit plane formed by switching on a diode, while FIG. 3(b) illustrates an open circuit plane formed by switching off the diode. As shown in FIG. 3(c), an input signal designated by A to a bridge is used to explain the input and output characteristics of the device. As shown in FIG. 2 to FIG. 5, the hybrid bridge circuit 109 is composed of bridge 1 (104), bridge 2 (106), bridge 3 (108), and the phase modulation switch 105, where the bridge 1 (104) and the bridge 2 (106) are implemented by rectangular waveguide broad-wall coupled 3 dB bridges. The broad-wall coupled 3 dB bridge is a 4-port microwave component. When a signal is input to port 1, given an input electric field E, port 2 is an isolated port with no output, while port 3 is a coupled port and port 4 is a straight-through port. An output signal from the coupled port and an output signal from the straight-through port are the same in amplitude, which is E/$\sqrt{2}$, but differ in phase, with the former leading by 90 degrees. The bridge 3 (108) is a broad-wall coupled Riblet waveguide 13 dB coupler, also known as a Riblet T-shaped slot coupler, which is highly directional and thus allows for a reduction in cross-interference of a sum signal in the bridge circuit. The Riblet T-shaped slot coupler, as shown in FIG. 6, is a dual-aperture directional coupler consisting of two rectangular waveguides placed in parallel, where the two waveguides share a broad wall in which two slots, one parallel and the other perpendicular to a lengthwise direction of the waveguides, are formed as coupling apertures. in a T shape. Besides, the degree of coupling can be varied by adjusting the positions and lengths of the coupling slots.

In the hybrid bridge circuit 109, the 0/π modulation on the difference channel signal Δ is achieved by means of the bridge 1 (104) and the phase modulation switch (105). With the 0/π phase modulation on a difference channel signal, nonorthogonality of outputs from two 3 dB bridges can be eliminated, thus allowing for reduction of error in angle tracking. When a PIN diode of the phase modulation switch is switched on under forward bias to short-circuit a transmission line, the phase shift between output signals is set as 0°; and when the PIN diode is under reverse bias and signals are output further over ΔL, the phase shift is correspondingly increased by π, thereby achieving the 0/π modulation on an input signal. Generally, ΔL is about λg/4, showing a prominent advantage in structural layout which is very compact. To be more specific, ΔL is a distance between a waveguide terminal and the diode, and λg is a waveguide wavelength.

When a sum signal (electric field) input to the hybrid bridge circuit 109 during reception is $\Sigma e^{j90°}$ and a difference signal that passes through the bridge 1 (104) and the phase modulation switch is $\pm\Delta e^{j90°}$, in case of the phase of a coupling arm 90° ahead of that of a straight-through arm after the sum signal passes through the bridge 1, outputs are as follows:

$\Sigma\mp\Delta$ channel: $\sqrt{2}\Sigma e^{j90°}\mp\sqrt{2}e^{j180°}\sim j\sqrt{2}\mp\sqrt{2}=\sqrt{2}(j\Sigma\mp\Delta)$ $\Sigma\mp\Delta$ channel: $\sqrt{2}\Sigma e^{j180°}\mp\sqrt{2}e^{j90°}\sim-\sqrt{2}\mp j\sqrt{2}=\sqrt{2}(-\Sigma\mp\Delta)$ According to monopulse theory, in an amplitude-comparison monopulse system, imbalance in amplitude between two beams of a receiving antenna merely results in deviation of an aiming axis of the antenna, which is a fixed error and can be eliminated by correction in installation. However, imbalance in phase therebetween may cause an angle tracking error. Limited by a feed source and a sum-difference network, the imbalance in phase between sum and difference signals output from the antenna is difficult to reduce and usually corrected in backward stage. With the channel combining technique, sum and difference signals are transmitted on a single channel, so that additional phase shift due to transmission of sum and difference signals on different channels can be avoided and a phase difference between sum and difference channels can be corrected easily, with a channel combining point as close to the sum-difference network as possible. After the channel combining, output signals are in the form of Σ+Δ and Σ−Δ. Therefore, before sum and difference signals are input to a combining mechanism, sum and difference transmission channels may usually be subjected to phase matching (typically, a phase shifter or a U-shaped waveguide is added to a waveguide transmission line) to maximize the amplitude of the output signal (Σ+Δ) or minimize the amplitude of the output signal (Σ−Δ). As a result, good phase matching can be achieved.

Figure 7:
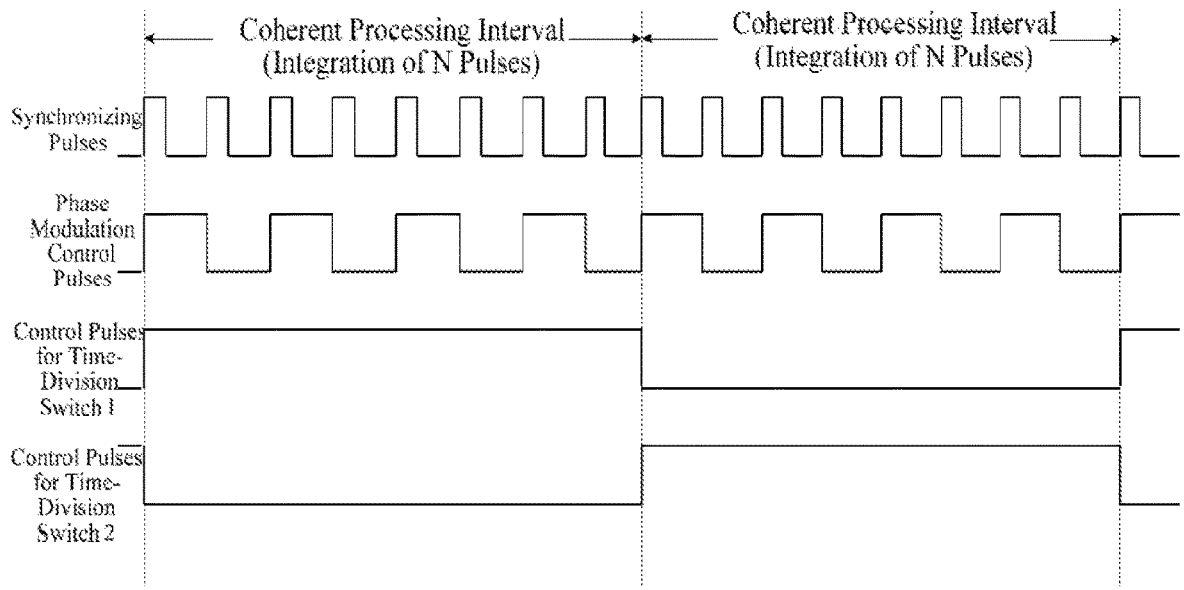
FIG. 7 is a diagram illustrating a timing relationship of control signals of a hybrid bridge circuit according to an example of the disclosure.

Regarding a pulse Doppler radar seeker, a received signal may be subjected to pulse integration due to a pulse-to-pulse coherent signal transmitted. This can be achieved only in combination with a timing sequence of coherent pulse integration during channel combining and time-division processing. A timing relationship of radar synchronizing pulses (SYN), a phase modulation control signal (PC1), a control signal (TC1) for time-division switch 1 and a control signal (TC2) for time-division switch 2 is as shown in FIG. 7, where the synchronizing pulses (SYN) are radar synchronizing pulses; phase modulation control pulses (PC1) are used to control the phase modulation switch (105) in FIG. 1; and control pulses (TC1) for time-division switch 1 and control pulses (TC2) for time-division switch 2 are used to control the time-division switch 1 (101) and the time-division switch 2 (102) in FIG. 1, respectively. In case of integration of N pulses, the phase modulation control signal (PC1) is reversed in polarity at each synchronizing pulse leading edge to control the phase modulation switch (105) to achieve 0/π modulation on the difference signal Δ; and the control signal (TC1) for time-division switch 1 is reversed in polarity at intervals of N synchronizing pulses, while the control signal (TC2) for time-division switch 2 is opposite to the control signal for time-division switch 1 in polarity.

Figure 8:
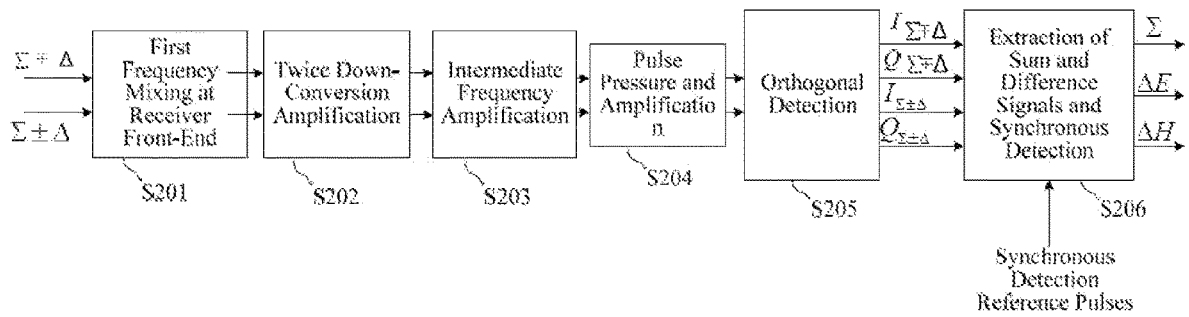
FIG. 8 is a flow chart of signal processing after channel combining according to an example of the disclosure.

After the channel combing, a processing flow of signals from two channels $\Sigma\mp\Delta$ and $\Sigma\pm\Delta$ is as shown in FIG. 8, where signals from two channels to an orthogonal detection input port are subjected to orthogonal detection to form two groups of signals, respectively, each composed of an in-phase component I and an orthogonal component Q. The signals from two channels $\Sigma\mp\Delta$ and $\Sigma\pm\Delta$ are down converted by two stages (S201, S202) to an intermediate frequency, and then subjected to intermediate frequency amplification (S203), pulse compression (S204) and orthogonal detection (S205). Subsequently, using a digital signal processor (S206), coherent pulse integration and extraction of sum and difference signals are carried out, followed by the separation of the elevation difference signal ΔE and the azimuth difference signal ΔH under the control of synchronous detection reference pulses.

Figure 9:
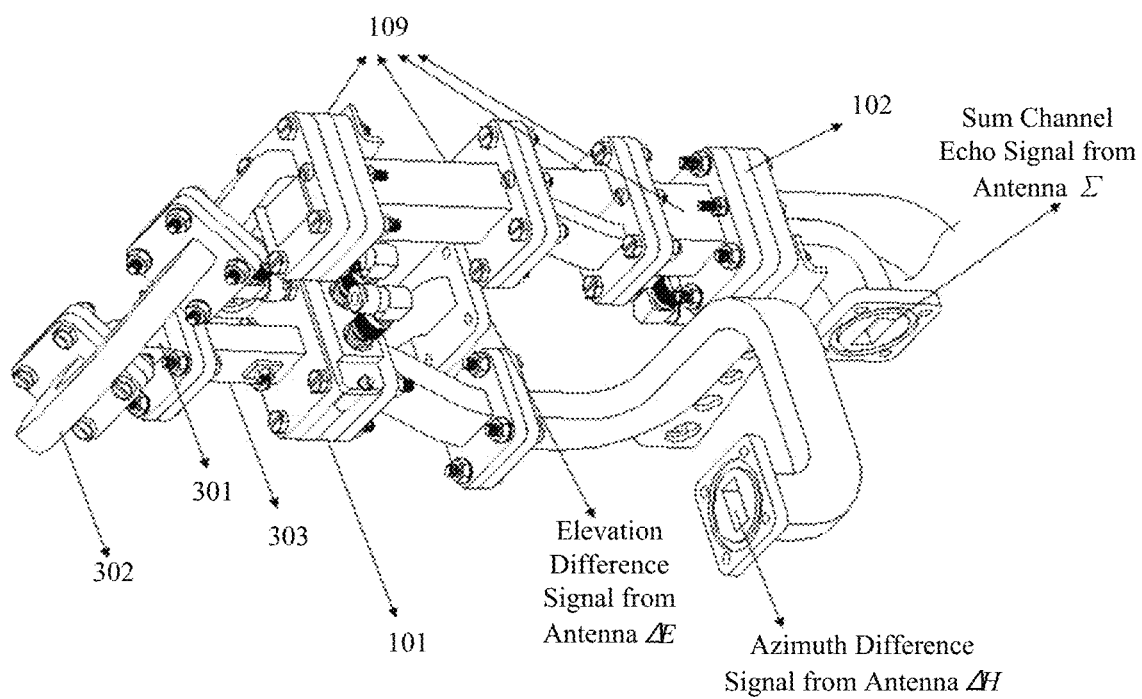
FIG. 9 is a schematic diagram of a three-dimensional structure of a hybrid bridge circuit according to an example of the disclosure.

A three-dimensional structure of the hybrid bridge circuit is as shown in FIG. 9, working in X-band, where each waveguide device has a broad wall dimension a=23 mm and a narrow wall dimension b=10 mm. A waveguide bend (301), a compensating waveguide bend (302) and a tuning waveguide (303) are used for port connection, phase compensation and tuning.

Several examples are used herein to explain the principles and implementations of the disclosure. The forgoing description of the examples is only intended to help with the understanding of the method of the disclosure and core ideas thereof. In addition, those of ordinary skill in the art can make various modifications in terms of specific implementations and scope of application in accordance with the ideas of the disclosure. In conclusion, the content of this specification shall not be construed as a limitation to the disclosure.

LIST OF REFERENCE NUMERALS

101 Time-division switch 1
102 Time-division switch 2
103 H-plane waveguide T-junction
104 Bridge 1
105 Phase modulation switch
106 Bridge 2
107 Matched load
108 Bridge 3
109 Hybrid bridge circuit
TC1 Time-division control signal 1
TC2 Time-division control signal 2
PC1 Phase modulation control signal 1
ΔE Elevation difference channel signal
ΔH Azimuth difference channel signal
Σ Sum channel signal
A' Self-test signal
Δ Difference channel signal
110 Resonant window
111 PIN diode mounting flange
112 Waveguide short circuit plane
S201 First frequency mixing at receiver front-end
S202 Twice down-conversion amplification
S203 Intermediate frequency amplification
S204 Pulse pressure and amplification
S205 Orthogonal detection
S206 Extraction of sum and difference signals and synchronous detection
$I_{\Sigma\mp\Delta}$ In-phase component of signal $\Sigma\mp\Delta$ after orthogonal detection
$Q_{\Sigma\pm\Delta}$ Orthogonal component of signal $\Sigma\pm\Delta$ after orthogonal detection
301 Waveguide bend
302 Compensating waveguide bend
303 Tuning waveguide

What is claimed is:

1. A channel combining and time-division processing circuit of a dual-plane pulse Doppler radar seeker, comprising:
   a time-division control circuit and a hybrid bridge circuit, the two of which are connected;
   wherein the time-division control circuit is configured to receive a time-division control signal, control input of an elevation difference channel signal and an azimuth difference channel signal according to the time-division control signal, combine the elevation difference channel signal and the azimuth difference channel signal and output a combined difference channel signal; and
   the hybrid bridge circuit is configured to receive a sum channel signal, combine channels for the sum channel signal and the combined difference channel signal and output signals on a combined channel;
   wherein the time-division control circuit comprises:
   a first time-division switch, a second time-division switch and a signal combining module;
   wherein the first time-division switch is connected to a first branch arm of the signal combining module and configured to receive a first time-division control signal and the elevation difference channel signal and control the input of the elevation difference channel signal to the signal combining module according to the first time-division control signal;
   the second time-division switch is connected to a second branch arm of the signal combining module and configured to receive a second time-division control signal and the azimuth difference channel signal and control the input of the azimuth difference channel signal to the signal combining module according to the second time-division control signal; and
   the signal combining module is connected to the hybrid bridge circuit by means of a third branch arm and configured to combine the elevation difference channel signal and the azimuth difference channel signal and input the combined difference channel signal to the hybrid bridge circuit.

2. The channel combining and time-division processing circuit of a dual-plane pulse Doppler radar seeker according to claim 1, wherein the signal combining module is an H-plane waveguide T-junction.

3. The channel combining and time-division processing circuit of a dual-plane pulse Doppler radar seeker according to claim 1, wherein the hybrid bridge circuit comprises:
   a first bridge, a second bridge, a third bridge and a phase modulation switch;
   wherein an input port of the first bridge is connected to the third branch arm of the signal combining module; a coupled port and a straight-through port of the first bridge are both connected to the phase modulation switch that is configured to receive a phase modulation control signal and perform phase modulation according to the phase modulation control signal; an isolated port of the first bridge is connected to an input port of the second bridge and configured to input a phase modulated signal to the second bridge;

an input port of the third bridge is configured to receive the sum channel signal; a straight-through port of the third bridge is connected to an isolated port of the second bridge, and a coupled port and a straight-through port of the second bridge are both configured to output the signals on the combined channel.

4. The channel combining and time-division processing circuit of a dual-plane pulse Doppler radar seeker according to claim 3, wherein an isolated port of the third bridge is configured to receive the input of a self-test signal which is used to stimulate an input sum channel signal in a self-test condition of the radar seeker.

5. The channel combining and time-division processing circuit of a dual-plane pulse Doppler radar seeker according to claim 4, wherein the hybrid bridge circuit further comprises:

a matched load;

wherein the matched load is connected to a coupled port of the third bridge and configured to suppress echo from the coupled port of the third bridge.

6. The channel combining and time-division processing circuit of a dual-plane pulse Doppler radar seeker according to claim 5, wherein the first bridge and the second bridge are rectangular waveguide broad-wall coupled 3 dB bridges, and the third bridge is a 13 dB bridge.

7. The channel combining and time-division processing circuit of a dual-plane pulse Doppler radar seeker according to claim 1, wherein the first time-division switch and the second time-division switch are PIN waveguide switches.

* * * * *